United States Patent
Holland

(10) Patent No.: US 8,326,080 B2
(45) Date of Patent: Dec. 4, 2012

(54) HARD IMAGING DEVICES

(75) Inventor: William D. Holland, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/108,780

(22) Filed: May 16, 2011

(65) Prior Publication Data

US 2011/0216344 A1    Sep. 8, 2011

Related U.S. Application Data

(62) Division of application No. 10/699,011, filed on Oct. 31, 2003, now Pat. No. 7,965,901.

(51) Int. Cl.
| | |
|---|---|
| G06K 9/40 | (2006.01) |
| B41J 2/435 | (2006.01) |
| G06T 5/00 | (2006.01) |
| H04N 1/407 | (2006.01) |
| H04N 1/409 | (2006.01) |
| G02B 26/00 | (2006.01) |

(52) U.S. Cl. ........ 382/275; 347/249; 358/3.26; 359/291
(58) Field of Classification Search .......... 382/254, 382/275; 347/224, 249; 358/3.26; 359/197, 359/291
See application file for complete search history.

(56) References Cited

U.S. PATENT DOCUMENTS

| | | | |
|---|---|---|---|
| 4,270,131 A | 5/1981 | Tompkins et al. | |
| 4,633,272 A | 12/1986 | Hardy | |
| 4,717,925 A | 1/1988 | Shibata et al. | |
| 4,804,981 A | 2/1989 | Prakash et al. | |
| 4,885,594 A | 12/1989 | Eguchi | |
| 5,018,805 A | 5/1991 | Kessler | |
| 5,594,845 A | 1/1997 | Florent et al. | |
| 5,751,863 A | 5/1998 | Farr | |
| 5,832,012 A | 11/1998 | Araki et al. | |
| 5,933,184 A | 8/1999 | Ishigami et al. | |
| 6,141,031 A | 10/2000 | Nowak et al. | |
| 6,611,348 B1 | 8/2003 | Chase et al. | |
| 6,930,701 B2 | 8/2005 | Eom | |
| 7,965,901 B2 * | 6/2011 | Holland | 382/275 |

FOREIGN PATENT DOCUMENTS

| | | |
|---|---|---|
| EP | 713323 | 5/1996 |
| EP | 0814605 | 12/1997 |

OTHER PUBLICATIONS

"Software Product Information", www.opticalres.com/products_f.html, 4 pages, Oct. 30, 2003.
HPDC, PCT Int'l Search Report, Application No. PCT/US2004/034977, Filed Oct. 21, 2004 (Priority Filed Oct. 31, 2003), by European Patent Office, HV Rijswijk, Netherlands, report mailed Mar. 30, 2005.
Theodoracatos V "A 3-D vision system model for automatic object surface sensing", International Journal of Computer Vision, 1993, pp. 75-99.

* cited by examiner

*Primary Examiner* — Bernard Krasnic

(57) ABSTRACT

An example hard imaging device includes an interface to access image data corresponding to images to be formed using the hard imaging device. The example hard imaging device further includes processing circuitry in communication with the interface to access the image data, to access correction data corresponding to a geometric distortion of a scan lens of an optical scanning system of the hard imaging device, and to modify the image data according to the correction data to reduce image errors introduced during optical scanning of the image data using the optical scanning system.

12 Claims, 3 Drawing Sheets

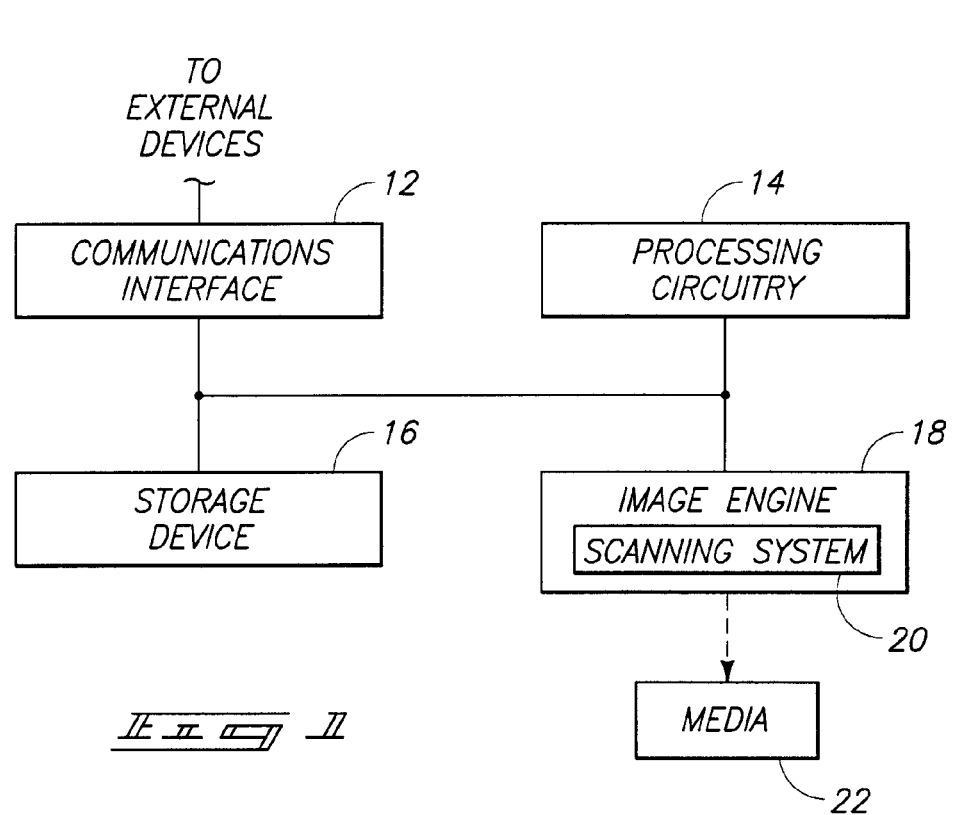
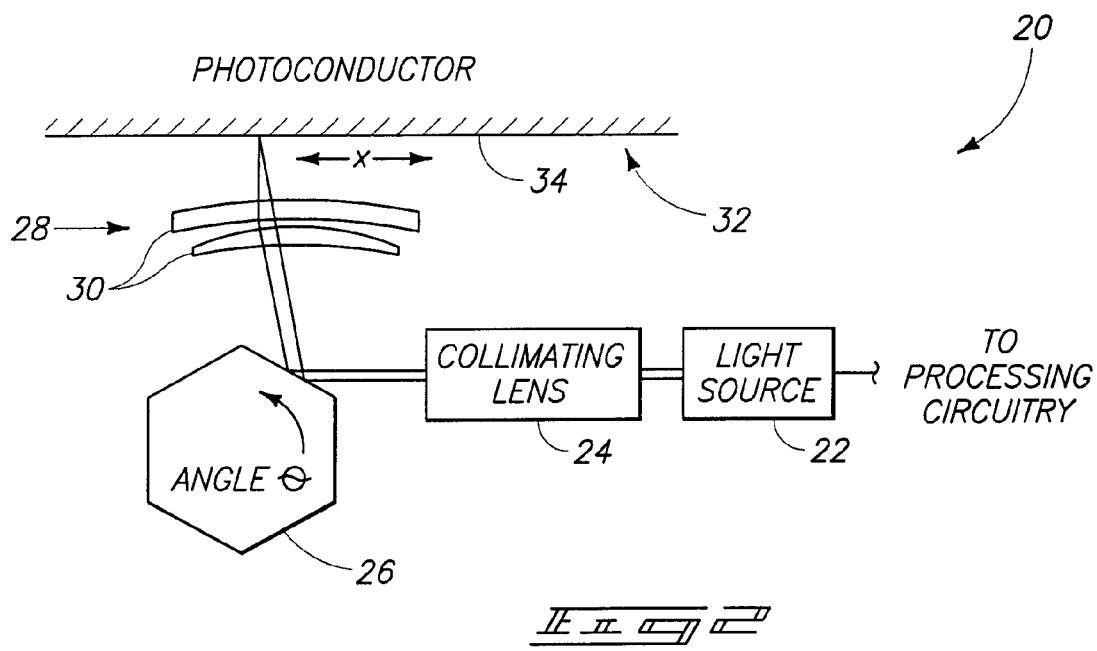

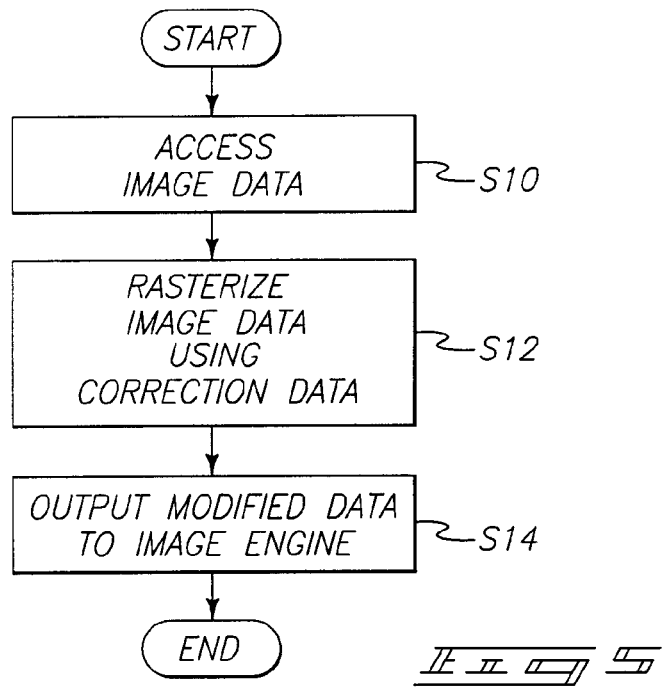
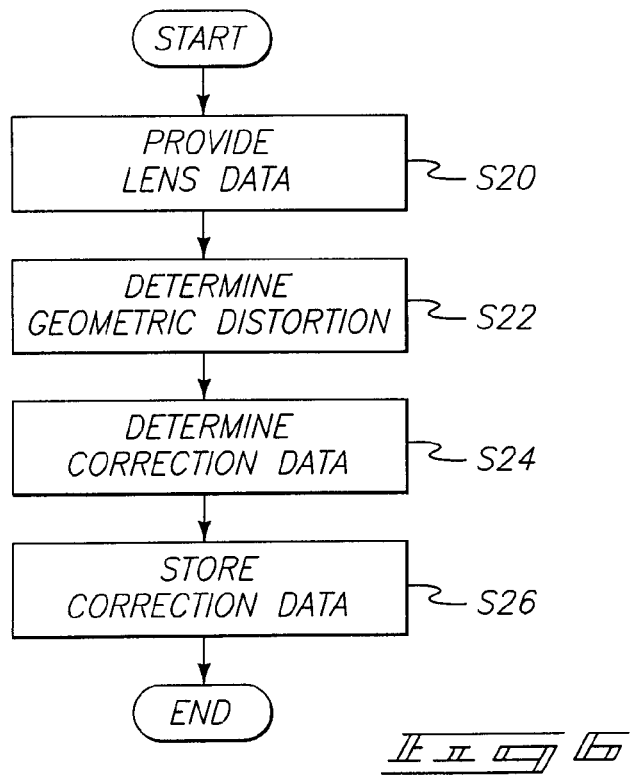

HARD IMAGING DEVICES

CROSS-REFERENCE TO RELATED APPLICATION

This patent arises from a divisional application of U.S. patent application Ser. No. 10/699,011, filed Oct. 31, 2003, now U.S. Pat. No. 7,965,901, the contents of which are incorporated herein by reference.

FIELD OF THE INVENTION

At least some embodiments of the invention relate to hard imaging methods, hard imaging device fabrication methods, hard imaging devices, hard imaging device optical scanning systems, and articles of manufacture.

BACKGROUND OF THE INVENTION

Computer systems including personal computers, workstations, hand held devices, etc. have been utilized in an increasing number of applications at home, the workplace, educational environments, entertainment environments, etc. Peripheral devices of increased capabilities and performance have been developed and continually improved upon to extend the functionality and applications of computer systems. For example, imaging devices, such as digital presses or printers, have experienced significant advancements including refined imaging, faster processing, and color reproduction.

Some imaging devices form latent images upon a photoconductor during imaging operations. A scan lens may be used to focus light (from a laser) along a scan line of the photoconductor to write data for a plurality of pixels on the scan line. The focused light may be used to selectively discharge pixels of the scan line to form latent images which are subsequently developed using a marking agent, such as toner.

Some printers have utilized scan lens having little or minimal scan geometry error which may be represented as a linear displacement along a scan line with respect to a scan angle of a rotating polygon mirror used to reflect the light from the light source towards the scan lens. These scan lens configurations may utilize a significant number of degrees of freedom (e.g., numerous lenses and/or lens surfaces) resulting in complex and perhaps costly designs.

Aspects described herein provide improved apparatus and methods for optical scanning in hard imaging implementations.

SUMMARY OF THE INVENTION

At least some embodiments of the invention relate to hard imaging methods, hard imaging device fabrication methods, hard imaging devices, hard imaging device optical scanning systems, and articles of manufacture.

According to one embodiment, a hard imaging method comprises providing image data corresponding to a hard image to be formed and generating light responsive to the image data. The method also includes scanning the light to form a latent image corresponding to the hard image to be formed and accessing correction data corresponding to scanning errors of a scan lens intermediate a rotating reflection device and a photoconductor. The method also provides modifying the image data using the correction data before the generating to reduce the introduction of image errors resulting from the scanning using the scan lens.

According to an additional embodiment, a hard imaging device comprises an interface configured to access image data corresponding to images to be formed using a hard imaging device and processing circuitry coupled with the interface and configured to access the image data. The processing circuitry is additionally configured to access correction data corresponding to scanning error of an optical scanning system of the hard imaging device, and to modify the image data according to the correction data to reduce image errors introduced during optical scanning of the image data using the optical scanning system.

Other aspects of the invention are disclosed herein as is apparent from the following description and figures.

DESCRIPTION OF THE DRAWINGS

FIG. 1 is a functional block diagram of a hard imaging device according to one embodiment.

FIG. 2 is an illustrative representation of a scanning system according to one embodiment.

FIG. 5 is a flow chart of a methodology of modifying image data to accommodate scan geometry error of a scanning system according to one embodiment.

FIG. 6 is a flow chart of a methodology of determining correction data corresponding to scan geometry error of a scanning system according to one embodiment.

DETAILED DESCRIPTION OF THE INVENTION

Figure 3:
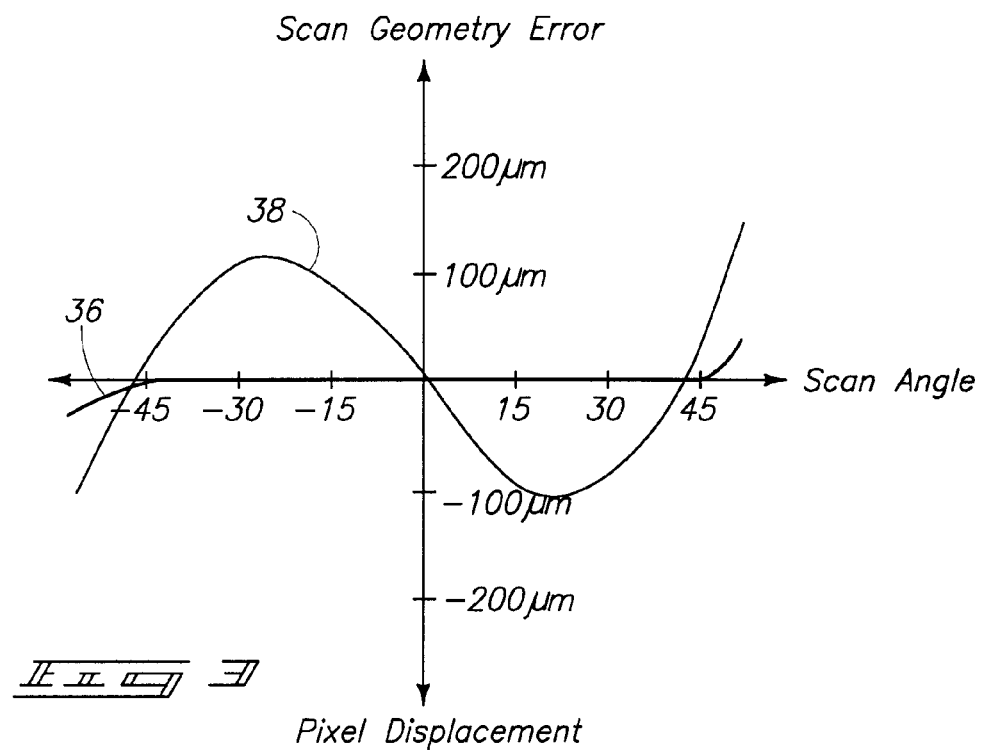
FIG. 3 is a graphical representation of exemplary scan geometry error of a scanning system according to one embodiment.

According to at least some embodiments or aspects, apparatus and methods for enabling generation of quality hard images using optical lens having scan geometry error are described. Exemplary aspects enable the utilization of less complex and/or expensive scan optics within a hard imaging device to provide scanning operations to produce hard images of acceptable quality. In one embodiment, image data to be imaged is modified prior to scanning operations using the image data to accommodate the scan geometry error of the scan optics and to provide acceptable output. In another embodiment, a timing of outputting information for pixels of a scan line is varied to accommodate scan geometry error. Other aspects are disclosed below.

FIG. 1 shows an exemplary configuration of a hard imaging device 10. Hard imaging device 10 is configured to form hard images. Hard images comprise images physically rendered upon output media 22, such as sheet paper, roll paper, envelopes, transparencies, labels, etc. Hard imaging device 10 may be implemented as an electrophotographic device such as a digital press (e.g., an HP1000 or HP3000 Indigo press available from Hewlett-Packard Company) in one embodiment. Other possible embodiments of hard imaging device 10 include laser printers, copiers, facsimile devices, multiple function peripheral (MFP) devices, or any other configuration arranged to form hard images upon media 22.

The illustrated exemplary hard imaging device 10 includes a communications interface 12, processing circuitry 14, a storage device 16, and an image engine 18. The depicted example of hard imaging device 10 comprises a digital press for discussion purposes. Other implementations are possible as mentioned previously.

Communications interface 12 is configured to communicate electronic data externally of hard imaging device 10. In one embodiment, interface 12 is arranged to provide input/output communications with respect to external devices, via for example, a communications medium (not shown) implemented in a networked arrangement of private and/or public devices in one example. Image data may be provided from an external device (e.g., host) to hard imaging device 10 using communications interface 12. Alternately, image data may be generated internally of device 10 or otherwise obtained. Exemplary image data includes page description language (PDL) data (e.g., computer readable list of objects to be hard imaged on a page and may include text and/or line art, for example, along with location, size, color and other attributes of the individual objects), or any other data comprising content to be hard imaged. A page description for a page to be hard imaged may be accessed and processed using processing circuitry 14. Image data before modification to correct for scan geometry errors described below may be referred to as original or initial image data of an original or initial image or initial format.

Processing circuitry 14 is configured to access and process image data (e.g., rasterize PDL image data) and control operations of hard imaging device 10 (e.g., communications, imaging, etc.). Processing circuitry 14 may comprise circuitry configured to implement desired programming (e.g., a microprocessor or other structure configured to execute software and/or firmware instructions). Other exemplary embodiments of processing circuitry 14 include hardware logic, PGA, FPGA, ASIC, and/or other processing structures. These examples of processing circuitry 14 are for illustration and other configurations are possible for processing image data and controlling operations of hard imaging device 10.

Storage device 16 is configured to store electronic data (e.g., initial image data, raster image data, etc.), programming such as executable instructions (e.g., software and/or firmware), and/or other digital information and may include processor-usable media. Processor-usable media includes any article of manufacture which can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

Image engine 18 is configured to form hard images upon output media 22. In one embodiment, image engine 18 comprises development and fusing assemblies configured to form the hard images using a marking agent, such as liquid ink or toner. An exemplary development assembly comprises an optical scanning system 20 configured to form latent images upon a photoconductor (not shown in FIG. 1). Image engine 18 may be configured to generate monochrome and/or color hard images.

Referring to FIG. 2, details of one configuration of optical scanning system 20 of image engine 18 of an exemplary electrophotographic color digital press is shown. The illustrated scanning system 20 includes a light source 22, a collimating lens 24, a reflection device 26, and a scan lens 28 comprising a plurality of lens elements 30. Other arrangements of scanning system 20 are possible. The illustrated exemplary optical scanning system 20 is embodied as a polygonal scanner operable to scan a laser beam over a photoconductor 32 in a raster pattern in the described arrangement.

Light source 22 is configured to emit light to be used to form latent images responsive to raster image data from processing circuitry 14 (e.g., the data may be buffered or internally stored in storage device 16 following processing by circuitry 14 and before application to light source 22). Light source 22 is arranged as a laser diode (e.g., VCSEL) in one possible configuration.

Collimating lens 24 is arranged to receive the generated light and to apply the light to reflection device 26. Collimating lens 24 outputs a parallel bundle of light towards reflection device 26 responsive to the received light from light source 22.

Reflection device 26 is configured to receive the parallel bundle of light from collimating lens 24 and to direct the light towards a photoconductor 32. The illustrated exemplary reflection device 26 comprises a rotating polygon mirror comprising a plurality of facets. Individual facets of the device 26 are configured to form respective individual scan lines upon a surface 34 of photoconductor 32. For example, in the illustrated embodiment, device 26 rotates in a counter-clockwise direction. The rotation causes the light to move in an x direction from right to left (also referred to as a scan direction) to form individual scan lines of a resultant latent image formed upon photoconductor surface 34.

Scan lens 28 operates to alter the light reflected from device 26. For example, the scan lens 28 may focus the received light to a single pixel location of the scan line being imaged at a given moment of time. Accordingly, a plurality of pixels of a scan line are written from right to left in the depicted exemplary configuration.

Photoconductor 32 may be cylindrical and configured to rotate along an axis in the scan direction and orthogonal to the axis of rotation of reflection device 26. Photoconductor 32 receives the scanned laser beam light in a raster pattern (i.e., two-dimensional array of pixels). Light source 22 is turned on and off responsive to raster image data to selectively discharge some pixels and to form a latent image. In one embodiment, the discharged pixels attract toner during subsequent development operations, and the developed image may be subsequently transferred onto media 22 to produce a hard image.

Scan lens 28 determines the scan geometry along a scan line. More specifically, as emitted light reflects of individual facets of refection device 26, it passes through scan lens 28 and onto photoconductor 32 forming a single scan line. In the described embodiment, photoconductor 32 rotates and successive scan lines are laid down sequentially on surface 34 forming a desired two-dimensional raster. The scan geometry is the relationship between the angle of rotation of the reflection device 26 ($\theta$) and the displacement (in the x direction) of the spot (e.g., pixel) where the focused light lands on surface 34 of photoconductor 32. In some embodiments, the spot of the light moves along a scan line at a constant velocity so processing circuitry 14 may clock out pixels to light source 22 at a substantially constant rate. A configuration of scan lens 28 meeting this design criteria may be referred to as a f-$\theta$ lens (wherein the spot displacement in an x direction substantially equals the lens focal length f times the respective polygon angle of device 26 in the illustrated embodiment).

Some arrangements of scan lens 28 comprise a plurality of degrees of freedom to meet design constraints. Degrees of freedom may be increased by adding lens elements 30 or lens surfaces to the scan lens 28 resulting in increased complexity and cost. Scan lens 28 having less degrees of freedom may introduce errors in scan geometry, causing variations in pixel spacing and pixel size as data is read out from circuitry 14 at a constant rate along individual scan lines, and thus a geometric warping of what is hard imaged.

Referring to FIG. 3, an exemplary graphical representation of scan geometry error of different scan lens is shown. Line 36 corresponds to a scan lens configuration having sufficient degrees of freedom to function as an ideal scan lens. Line 38 corresponds to a scan lens configuration having insufficient degrees of freedom and the resultant scan geometry error (also referred to as scanning error) associated with the particular scan lens (e.g., less complex than scan lens 36). As described below, disclosed aspects enable the use of a scan lens 28 having associated scan geometry or scanning error within scanning system 20 and device 10 configured to accommodate the error and provide acceptable hard imaging operations.

Figure 4:
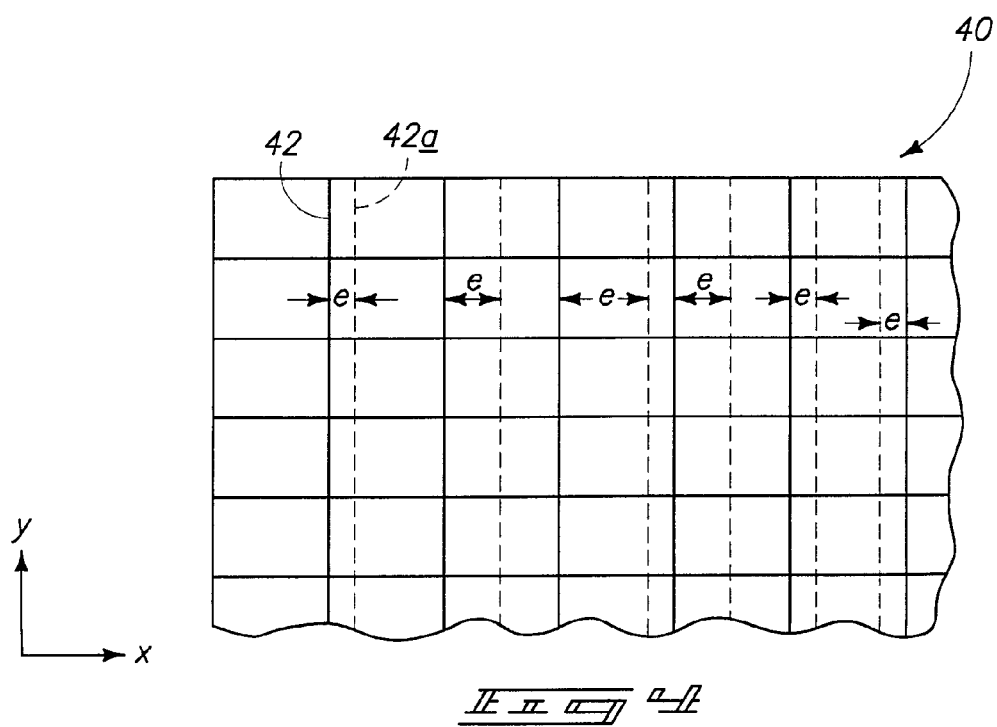
FIG. 4 is an exemplary hard image generated by a scanning system having scan geometry error according to one embodiment.

Referring to FIG. 4, an example of geometric warping is illustrated. FIG. 4 depicts a grid (e.g., graph paper) 40 having a plurality of vertical lines 42. Vertical lines 42 depict the lines and spacing in the scan (x) direction of the original image to be formed. Vertical lines 42a illustrate resultant lines which may be actually formed due to geometric warping. In one example, vertical lines 42a may be spaced farther apart than desired adjacent the left and right borders of an imaged sheet (e.g., in the scan direction) and spaced closer together than desired in a middle portion of the imaged sheet in one example. The character "e" indicates image error introduced into formed latent images responsive to the scanning error of the scan lens 28 and represents erroneous displacement of the image data either to the left or right in the scan direction.

Aspects described herein permit hard imaging operations with satisfactory results while utilizing of scan lens 28 having scan geometry distortion (e.g., insufficient degrees of freedom). In one embodiment, processing circuitry 14 may be configured to provide image processing operations with an assumption that pixels in a raster to be imaged are not evenly spaced. Processing circuitry 14 may pre-warp image data to cancel geometric warping introduced by scan lens 28 to provide hard images representing the original image data of acceptable accuracy. In one embodiment, the scan lens 28 to be utilized in device 10 is analyzed to determine the scan geometry error (e.g., FIG. 3). For example, a scan lens design package, such as Code V available from Optical Research Associates of Pasadena, Calif. (http://www.opticalres.com), may be utilized to design a desired scan lens 28. Constraints of a desired scan lens 28 may be provided. One or more appropriate scan lens 28 may be designed using different lens geometries and/or materials. Once a particular design which meets desired constraints is selected (or is otherwise acceptable), the design package may also provide the geometric distortion of the scan lens 28 (e.g., curve 38 of FIG. 3). The optical design package can output a graph, table, or equation that characterizes the geometric distortion of the optics. The inverse graph, table, or equation characterizes the inverse geometric distortion which may be applied in the raster image processor described below or other structure.

Using the determined scanning error of scan lens 28 (e.g., geometric distortion), correction data to be used by processing circuitry 14 to "pre-warp" image data to be hard imaged may be calculated. In one embodiment, correction data comprising geometric or perspective transforms may be calculated from the geometric distortion. In one illustrative example, the correction data may be determined from the geometric distortion using techniques described in "Computer Graphics: Principles and Practice (Second Edition in C)," Foley, James D., Andres van Dam, Steven K. Feiner, and John F. Hughes authors, 1996, Addison-Wesley Publishing Company, ISBN 0-201-84840-6, the teachings of which are incorporated herein by reference. The correction data may be an inverse perspective transform of the geometric distortion curve determined from the design of scan lens 28. In one embodiment, the correction data is stored within storage device 16 and is accessible by processing circuitry 14.

Once the correction data is determined, processing circuitry 14 can modify the image data to account for the geometric distortion and reduce, cancel or minimize image errors resulting from the geometric distortion. In one embodiment, processing circuitry 14 operates as a raster image processor (RIP). A raster image processor may accept a high-level description of a page to be printed and produce binary raster image data. The raster image data is given to image engine 18 which generates images upon media 22. In one example, the high-level page description is cast into the Adobe PostScript language. This description may include characters in various fonts and colors, line art (lines, polygons, arcs, circles, strokes, outlines, etc.), and continuous tone images, in the form of a PostScript program.

Initially, the raster image processor processes the high-level page description to parse the page description and extract one or more graphical objects it defines. According to the described example, the execution of a PostScript program by the raster image processor produces a display list which comprises a list of primitive graphical objects and their attributes (size, location, color, etc.). Objects to be hard imaged (or "displayed") on the page are contained in the display list. This extends even to individual halftone dots produced by the application of a halftone screen to any continuous tone images or colored objects in the page. Complex objects may be broken down into simple graphics primitives for inclusion in the display list.

Thereafter, the raster image processor may rasterize the display list. The raster image processor may calculate an intersection of individual scan lines with primitive graphical objects in the display list and determine which pixels to turn on and turn off to draw individual scan lines. The raster image processor produces binary raster image data for output to an image engine 18.

If the optics of image engine 18 have no substantial geometric distortion, a conventional raster image processor may be employed to convert a page description into a display list and then into binary raster image data for the image engine 18. If the optics of image engine 18 have geometric distortion, use of a conventional raster image processor will produce output with geometric distortion in the scan direction with no geometric distortion in the process direction.

In accordance with one embodiment, the correction data may be utilized to modify the raster image processor to generate binary raster image data that is geometrically distorted in the scan direction with the inverse geometric distortion (i.e., correction data), also referred to as a correction warp. When the raster data from this configured raster image processor is printed with image engine 18 having geometric distortion, the two distortions cancel each other, and the desired output is produced. Accordingly, in one embodiment, processing circuitry 14 may comprise a raster image processor configured to modify initial image data using the correction data, for example, during rasterization.

The modified raster image processor may be implemented in a plurality of exemplary embodiments. In one arrangement, the raster image processor may apply the correction warp to the primitive graphical objects in the display list to produce a new display list. The new display list contains pre-warped primitive graphical objects which may be rasterized in a conventional manner to produce the desired binary raster image data. However, if the correction warp is sufficiently complicated, simple primitive graphical objects (e.g., a circle) may become too complex after the correction warp is applied to be described as "primitive." In one example, a small circle (e.g., 10 or 100 pixels in diameter) may become a small ellipse. The respective axis in the process direction would still be 10 or 100 pixels, but the axis in the scan direction may increase or decrease to cancel the optical distortion. The axis in the scan direction might be 8 or 12 pixels, or 91 or 107 pixels, for example. The geometric description of an ellipse is typically simple enough for a list of primitive graphical objects.

In another example, if a circle were the size of the page, it may traverse all or many regions of the geometric warp of the optics, and of the correction warp. Parts of the circle may be stretched in the scan direction and other parts may be compressed. According to the currently described embodiment, there would be no simple primitive description of the circle after the application of the correction warp unless the circle were first broken down into a number of small arcs, and the correction warp applied to each arc. A modified raster image processor implemented in this manner may decompose individual large primitive graphical objects in the display list into a number of small primitive graphical objects in the new display list and apply the correction warp to each one.

Another exemplary implementation of a modified raster image processor may begin with a geometric intersection of individual scan lines with the list of primitive graphical objects in the display list. Since a scan line is one dimensional, the intersection can merely be a list of line segments, where each segment is the intersection of the scan line with one of the primitive graphical objects. The correction warp may be readily applied to the locations of the end points of individual line segments in the intersection, producing a new intersection. The new intersection may be rasterized by the raster image processor in the conventional manner to produce the desired binary raster image data.

In a more specific description, a scan line is not truly one dimensional but may be one pixel high and as many pixels wide as a scan line (e.g., thousands) comprising a rectangle. The modified raster image processor may calculate the intersection of this rectangle with the primitive graphical objects in the display list, producing (to an excellent approximation) a list of one-pixel-high trapezoids and less-than-one-pixel-high triangles as the intersection. The correction warp may be applied to the vertices of these trapezoids and triangles to produce a new intersection, still comprising a list of trapezoids and triangles. The new intersection may be converted to binary raster image data in the conventional manner. This technique avoids aliasing errors and Moiré patterns, which otherwise would be produced by processing the pixel raster with collections of primitive graphical objects, such as the dots, in a halftone screen pattern.

Following rasterization of the image data using the correction data, processing circuitry 14 may output the modified image data comprising raster data to light source 22 to control the emission of light to form the latent image. The modified image data may be outputted to light source 22 at a constant rate in one embodiment. Additional details regarding exemplary processing of image data to offset lens distortion are described in a U.S. Pat. No. 5,751,863, the teachings of which are incorporated by reference herein.

Accordingly, scan lens 28 in one arrangement, produces images upon photoconductor 32 which differ from images of the generated light from light source 22 due to scanning errors or geometrical distortion of the scan lens 28. Processing circuitry 14 may utilize correction data corresponding to the geometrical distortion to modify the raster image data such that latent images subsequently produced using scan lens 28 are correct or satisfactory representations of the initial or original image data before the described modification using processing circuitry 14.

Referring to FIG. 5, an exemplary methodology of processing circuitry 14 is shown. Other methods are possible including more, less, or alternative steps.

At a step S10, the processing circuitry accesses original or initial image data (e.g., PDL data).

At a step S12, the processing circuitry operates as a raster image processor (RIP) to rasterize the image data. In one embodiment, the processing circuitry modifies the initial image data using the correction data corresponding to scanning error of the scan lens.

At a step S14, the processing circuitry outputs the modified image data to a light source of the image engine.

Referring to FIG. 6, an exemplary methodology is depicted for configuring a hard imaging device. Other methods are possible including more, less or alternative steps.

At a step S20, an optical lens designer provides lens design criteria data for a scan lens to be utilized within the image engine of the hard imaging device.

At a step S22, scanning error information of the scan lens is determined. The scanning error information corresponds to geometric distortion of the scan lens in one embodiment and may be represented as pixel displacement in the scan direction relative to scan angle (e.g., angle of the facet reflecting light at a given moment in time).

At a step S24, correction data for the respective scan lens may be determined. The correction data may be provided in a form of a perspective transform corresponding to an inverse of the geometric distortion of the scan lens.

At a step S26, the correction data may be stored within the storage device for access by the processing circuitry during modification operations of the raster image data.

In accordance with another arrangement, the timing of the outputting of raster image data (information for individual pixels) from processing circuitry 14 to the light source 22 may be varied to compensate for geometric distortion (e.g., scanning error) of scan lens 28 and resulting in variation in pixel spacing (e.g., image error) along a scan line. In one exemplary embodiment, processing circuitry 14 may be configured to output raster image data according to a variable output of a variable frequency clock circuit (not shown). Exemplary details regarding a variable frequency clock circuit which may be utilized to control the timing of outputting of raster image data for pixels from processing circuitry 14 are described in U.S. Pat. No. 4,717,925, the teachings of which are incorporated by reference herein.

In one exemplary arrangement, the output of the frequency clock circuit could be controlled using the correction data to control the timing of the outputting of the raster image data from processing circuitry 14 (or other internal buffering or storage circuitry) to light source 22 to account for the scanning errors of scan lens 28 and reduce the presence of image errors. In the described example of FIG. 4, processing circuitry 14 could be controlled to output the information of the most left line 42 at a later moment in time corresponding to line 42a plus the respective scanning error "e" to provide the information at the correct location of line 42. The modifying in the described example includes modifying the outputting of the timing of the raster data using the correction data and corresponding to the initial image data without modification of the image data using the correction data described above.

The exemplary embodiments described herein enable the utilization of a relatively simple scan lens 28 (e.g., less degrees of freedom) within an optical scanning system. The described embodiments correct or accommodate scan geometry error without utilization of complex scan lens having minimal or otherwise reduced scan geometry error (e.g., scan lens having an increased number of degrees of freedom compared with scan lens usable in the described embodiments). Exemplary embodiments enable production of hard images with unevenly spaced pixels if actual pixel spacing is known prior to outputting raster data to a light source 22 of the optical scanning system 20. At least one embodiment implements correction operations without the complexity and cost of a variable frequency clock circuit, and the correction to the scan geometry error may additionally be implemented in programming. Further, modulation of light source 22 according to at least some of the described embodiments may be readily accomplished at relatively high frequencies as a scan line is being written. In one example, an 800 dots-per-inch (DPI) hard imaging device 10 may modulate the light source 22 at three times the pixel rate for an effective resolution of 2400 DPI along scan lines providing relatively fine resolution. Accordingly, it is possible to achieve a relatively high degree of geometric correction producing high-quality hard images.

The protection sought is not to be limited to the disclosed embodiments, which are given by way of example only, but instead is to be limited only by the scope of the appended claims.

What is claimed is:

1. A processor-readable storage device or storage disk comprising instructions which, when executed, cause processing circuitry of a hard imaging device to at least:
   access image data corresponding to an initial image to be hard imaged using the hard imaging device;
   access correction data corresponding to image errors introduced by an optical scanning system of the hard imaging device;
   modify the image data responsive to the correction data to improve an accuracy of a hard image formed by the optical scanning system responsive to the image data and with respect to the initial image; and
   output the modified image data to the optical scanning system of the hard imaging device, wherein pixels corresponding to the modified image data are to be output to the optical scanning system at a constant rate.

2. The storage device or storage disk of claim 1 wherein the instructions cause the processing circuitry to access the correction data comprising correction data to reduce the image errors introduced by the optical scanning system.

3. The storage device or storage disk of claim 1 wherein the correction data comprises an inverse representation of a geometric distortion of the optical scanning system.

4. The storage device or storage disk of claim 1 wherein the instructions cause the processing circuitry to operate as a raster image processor to modify the image data.

5. A method comprising:
   accessing image data corresponding to an initial image to be hard imaged using a hard imaging device;
   accessing correction data corresponding to image errors introduced by an optical scanning system of the hard imaging device;
   modifying the image data responsive to the correction data to improve an accuracy of a hard image formed by the optical scanning system responsive to the image data and with respect to the initial image; and
   outputting the modified image data to the optical scanning system of the hard imaging device, wherein pixels corresponding to the modified image data are to be output to the optical scanning system at a constant rate.

6. The method of claim 5 wherein the correction data comprises correction data to reduce the image errors introduced by the optical scanning system.

7. The method of claim 5 wherein the correction data comprises an inverse representation of a geometric distortion of the optical scanning system.

8. The method of claim 5 further comprising operating as a raster image processor to modify the image data.

9. An apparatus comprising:
   an interface to access image data corresponding to an initial image to be hard imaged using a hard imaging device; and
   processing circuitry in communication with the interface to:
      access correction data corresponding to image errors introduced by an optical scanning system of the hard imaging device;
      modify the image data responsive to the correction data to improve an accuracy of a hard image formed by the optical scanning system responsive to the image data and with respect to the initial image; and
      output the modified image data to the optical scanning system of the hard imaging device, wherein pixels corresponding to the modified image data are to be output to the optical scanning system at a constant rate.

10. The apparatus of claim 9 wherein the processing circuitry is to access the correction data comprising correction data to reduce the image errors introduced by the optical scanning system.

11. The apparatus of claim 9 wherein the correction data comprises an inverse representation of a geometric distortion of the optical scanning system.

12. The apparatus of claim 9 wherein the processing circuitry is to operate as a raster image processor to modify the image data.

* * * * *